Patented Dec. 28, 1943

2,337,858

UNITED STATES PATENT OFFICE 2,337,858

PREPARATION OF MALONIC ESTERS

Wesley C. Stoesser, Midland, Mich., assignor to The Dow Chemical Company, Midland, Mich., a corporation of Michigan No Drawing. Application May 31, 1940, Serial No. 338,040

4 Claims. (Cl. 260—485)

This invention concerns an improved process for the preparation of the lower alkyl esters of malonic acid, and in particular relates to the manufacture of diethyl malonate.

The neutral lower alkyl esters of malonic acid, e. g. dimethyl malonate, diethyl malonate, di-n-propyl malonate, di-isobutyl malonate, and other dialkyl malonates in which each of the alkyl groups contains at most 4 carbon atoms, are manufactured commercially by the simultaneous hydrolysis and esterification of sodium cyanoacetate. This process, as applied to the manufacture of diethyl malonate, has been described in detail by Ross and Bibbins (Ind. & Eng. Chem., vol. 29, pp. 1341-1343, December 1937), and consists essentially in heating to reflux temperature a mixture of solid sodium cyanoacetate, sulphuric acid, and ethyl alcohol, whereby reaction takes place according to the equation:

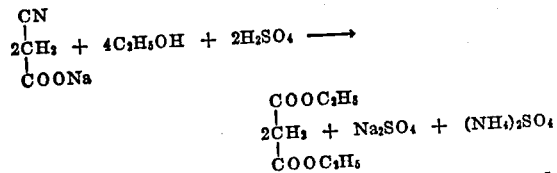

The diethyl malonate thus formed is recovered from the crude reaction product by diluting the latter with water and subjecting the dilute mixture to several extractions with benzene or other suitable organic solvent such as toluene, chlorobenzene, carbon tetrachloride, petroleum fractions, etc. The combined benzene extracts are then washed with aqueous sodium hydroxide and the ester product is separated from the washed benzene extract by fractional distillation. Such mode of operation produces diethyl malonate of about 90 per cent purity in yields averaging 70 per cent of the theoretical.

I have now found that during the hydrolysis and esterification of an alkali-metal cyanoacetate with sulphuric acid and a lower aliphatic alcohol, appreciable amounts of the mono-alkyl malonate and/or free malonic acid are formed, and that by returning these products to the reaction, a considerable increase in the yield of the desired di-ester may be realized. Since the mono-ester and free acid are soluble in dilute alkalies and to some extent in water, they have heretofore been discarded with the alkaline liquors with which the benzene extract has been washed and/or with the aqueous liquor from the benzene extraction of the diluted reaction product. By recovering the mono-ester and acid from the crude reaction product and subjecting them to esterification along with the alkali-metal cyanoacetate in a subsequent preparation, however, it is possible to obtain the desired di-ester in yields averaging 90 per cent of the theoretical.

The mono-alkyl malonate and/or free malonic acid by-products may be recovered from the crude reaction product in a number of ways. Thus, the process may be carried out as hereinbefore described with the exception that the alkaline wash liquors, instead of being discarded, are acidified, extracted with an organic solvent, and the latter thereafter removed by distillation. The residue consists essentially of the mono-alkyl malonate and probably also contains small amounts of free malonic acid. If desired, the aqueous residue from the benzene extraction of the diluted reaction product may also be processed for the free malonic acid and mono-alkyl malonate contained therein. However, since the crude product is usually contaminated with iron, which is precipitated as finely divided ferric ferrocyanide (Prussian blue) upon the addition of water, I have found it more satisfactory to omit the dilution step and to extract the crude product directly with the solvent, thereby avoiding the presence of the Prussian blue precipitate which is not only difficult to filter off but which also tends to cause emulsion formation during the subsequent extraction. Accordingly, the reaction product is usually extracted directly with the organic solvent without dilution with water. The extract is then washed several times with an aqueous alkali and the alkaline wash liquors, which contain the mono-alkyl malonate and malonic acid in the form of metal salts, are concentrated and added to the reaction mixture in a subsequent preparation. Alternatively, the extract may be distilled directly to remove the solvent and the di-alkyl ester product, and the mono-ester and free acid recovered as a high-boiling distillation residue.

In preparing neutral lower alkyl malonates according to a preferred mode of carrying out the process of the invention, the alkali-metal cyanoacetate is ordinarily prepared in the usual manner, i. e., by neutralizing an aqueous haloacetic acid, preferably 30 per cent chloroacetic acid, with an alkali-metal hydroxide to form an aqueous solution of an alkali-metal haloacetate, and thereafter treating such solution with a hot concentrated aqueous alkali-metal cyanide to form a solution of an alkali-metal cyanoacetate. The alkaline wash liquors recovered from a previous preparation as explained above are then added to the cyanoacetate solution and the mixture is concentrated, preferably under reduced pressure, to the point where it forms a solid cake upon cooling. The water content of such cake is preferably less than 10 per cent by weight. The hydrolysis and esterification reactions are carried out simultaneously by mixing the cyanoacetate cake with slightly more than the theoretical amount of the lower aliphatic alcohol, e. g. 2.3 moles of the alcohol per mole of cyanoacetate, and thereafter gradually adding approximately 2.25–2.50 molecular equivalents of concentrated sulphuric acid while maintaining a reaction temperature of about 85°–120° C. The reaction is usually complete in from 1½ to 4 hours, after which the mixture is cooled to about 60° C. and subjected to several extractions with an organic solvent, e. g. benzene. The combined solvent extracts are washed with a dilute aqueous alkali, e. g. 12.5 per cent aqueous sodium hydroxide, and the combined wash liquors are made definitely alkaline and added to the cyanoacetate solution in the next batch as explained above. The solvent is then removed from the washed extract by distillation under atmospheric or reduced pressure. The ester product remaining in the still is of sufficient quality to be employed as an intermediate in other chemical processes and is usually not subjected to further purification. If desired, however, it may be fractionally distilled under reduced pressure to obtain the product in pure form. In some instances, a small amount of mono-ester is obtained from such distillation as a high-boiling fraction which, if desired, may be added to the reaction mixture in the next batch.

The following examples illustrates several ways in which the principle of the invention has been applied, but are not to be construed as limiting the same.

Example 1

A solution of 189.0 grams (2.0 moles) of monochloroacetic acid in 450 grams of water was mixed with 200 grams of cracked ice and made alkaline to litmus by the addition of 50 per cent aqueous sodium hydroxide. To the sodium chloroacetate solution thus obtained there was added with stirring at 100° C. a hot solution of 101.0 grams (2.0 moles) of 97 per cent sodium cyanide in 200 grams of water. The resulting solution of sodium cyanoacetate was then evaporated under reduced pressure until there was obtained a crude sodium cyanoacetate cake containing approximately 10 per cent by weight of water. The cake was placed in a flask fitted with a reflux condenser and was mixed with 231 grams (4.7 moles) of 95 per cent ethyl alcohol containing 0.5 per cent benzene as a denaturant. 450 grams (4.50 moles) of concentrated sulphuric acid was then added to the flask through the reflux condenser over a period of about ½ hour, after which time the mixture was heated at 100° C. for 2 hours. The reaction mixture was then cooled to about 65° C. and extracted three times with 130 gram portions of benzene. The combined benzene extracts were washed with 12.5 per cent aqueous sodium hydroxide and water, and the wash liquors were saved for use in the next batch. The washed benzene extract was dried over anhydrous sodium sulphate and was distilled, initially under atmospheric pressure and finally under reduced pressure, to remove the benzene, whereby there was obtained 247 grams of diethyl malonate, corresponding to a yield of 77.3 per cent of the theoretical. The next batch was prepared in exactly the same manner, except that the alkaline wash liquors from the first batch were added to the sodium cyanoacetate solution before evaporation. There was obtained 273 grams of diethyl malonate, corresponding to a yield of 85.2 per cent of the theoretical. A third batch prepared in the same way, employing the alkaline wash liquors from the second batch, yielded 289 grams (90.4 per cent of the theoretical) of diethyl malonate. The wash liquors from the third batch were made strongly alkaline and evaporated to dryness, and the dry cake was heated with ethyl alcohol and sulphuric acid in the same manner as the sodium cyanoacetate cake. The reaction produce was extracted with benzene, washed, and distilled, whereby there was obtained 33.8 grams of diethyl malonate, corresponding to a yield of 10.6 per cent on a two-mole basis. The average yield for the three batches was 87.8 per cent of the theoretical.

Example 2

Diethyl malonate was prepared in the same manner as in Example 1 with the exception that 2.5 moles of sulphuric acid were employed per mole of monochloroacetic acid. From five two-mole preparations, including processing of the wash liquors from the last preparation as described in Example 1, there was obtained a total of 1,444 grams of diethyl malonate, corresponding to a yield of 90.4 per cent of the theoretical. This material was combined with that obtained in the preparations described in Example 1 and fractionally distilled under vacuum, and was found to contain 94.5 per cent of pure diethyl malonate distilling at 101° C. under 25 millimeters pressure.

Example 3

417 grams of sodium cyanoacetate cake, obtained by treating 2 moles of monochloroacetic acid with sodium hydroxide and sodium cyanide, was reacted with 4.6 moles of methyl alcohol and 5.0 moles of sulphuric acid as in Example 1. The crude reaction product was extracted with benzene and the benzene extract was washed with dilute sodium hydroxide and water. The wash liquors were saved for use in the next batch. After removal of the benzene from the extract by distillation, there was obtained 135 grams of dimethyl malonate, corresponding to a yield of 51.3 per cent of the theoretical. In a second two-mole run, wherein the alkaline wash liquors from the first batch were added to the cyanoacetate, a yield of 66.3 per cent of the theoretical was obtained.

Example 4

400 grams of sodium cyanoacetate cake, obtained by treating 2 moles of monochloroacetic acid with sodium hydroxide and sodium cyanide, was reacted with 4.6 moles of isopropyl alcohol and 5 moles of sulphuric acid as in Example 1. The crude reaction product was extracted with benzene and the benzene extract was washed with dilute sodium hydroxide and water. The wash liquors were acidified with dilute sulphuric acid, and the acid solution was extracted with benzene. The benzene was then distilled off under reduced pressure and the residue, comprising mono-isopropyl malonate and possibly some free malonic acid, was stored for use in the next batch. The di-isopropyl malonate product was obtained in 59.6 per cent yield by distilling the benzene from the washed benzene extract. In a second batch, wherein the mono-ester and free acid recovered from the first preparation was added to the reaction mixture, a yield of 70.5 per cent was obtained. A third batch, prepared in the same manner, gave a 77.7 yield of di-ester and sufficient mono-ester to form an additional 11.2 per cent yield of di-ester when esterified separately. The average yield for the three batches was about 70.2 per cent of the theoretical.

Other modes of applying the principle of my invention may be employed instead of those explained, change being made as regards the process herein disclosed, provided the step or steps stated by any of the following claims or the equivalent of such stated step or steps be employed.

I therefore particularly point out and distinctly claim as my invention:

1. In a process for the preparation of diethyl malonate, the steps which consist in evaporating an aqueous solution containing sodium cyanoacetate to form a solid cake containing less than about 10 per cent by weight of water, heating said cake to a reaction temperature with ethyl alcohol and sulphuric acid, subjecting the reaction product to extraction with benzene without dilution with water, washing the benzene extract with dilute aqueous sodium hydroxide, adding the wash liquors to the sodium cyanoacetate solution to be used in a subsequent preparation, and distilling the washed extract to separate the benzene from the diethyl malonate product.

2. In a process for the preparation of dimethyl malonate, the steps which consist in evaporating an aqueous solution containing sodium cyanoacetate to form a solid cake containing less than about 10 per cent by weight of water, heating said cake to a reaction temperature with methyl alcohol and sulphuric acid, subjecting the reaction product to extraction with benzene without dilution with water, washing the benzene extract with dilute aqueous sodium hydroxide, adding the wash liquors to the sodium cyanoacetate solution to be used in a subsequent preparation, and distilling the washed extract to separate the benzene from the dimethyl malonate product.

3. In a process for the preparation of a neutral lower alkyl ester of malonic acid wherein an alkali metal cyanoacetate is reacted with a lower aliphatic alcohol and sulphuric acid, the steps which consist in extracting the reacted mixture with an organic solvent, whereby an organic extract comprising the dialkyl malonate and a corresponding organic acid is obtained, separating the dialkyl malonate from said organic acid, and returning the latter to the aforesaid reaction of an alkali metal cyanoacetate with a lower aliphatic alcohol and sulphuric acid.

4. In a process for the preparation of a neutral lower alkyl ester of malonic acid wherein an alkali metal cyanoacetate is reacted with a lower aliphatic alcohol and sulphuric acid, the steps which consist in extracting the reacted mixture with a water-immiscible organic solvent, whereby an extract comprising the dialkyl malonate together with the organic acid is obtained, washing the organic extract with aqueous alkali, whereby the organic acid is removed from said extract as a salt which is dissolved in the wash liquor, adding the wash liquor to the alkali metal cyanoacetate to be used in a subsequent preparation, and distilling the washed organic extract to separate the organic solvent from the dialkyl malonate product.

WESLEY C. STOESSER.